Figure 1:
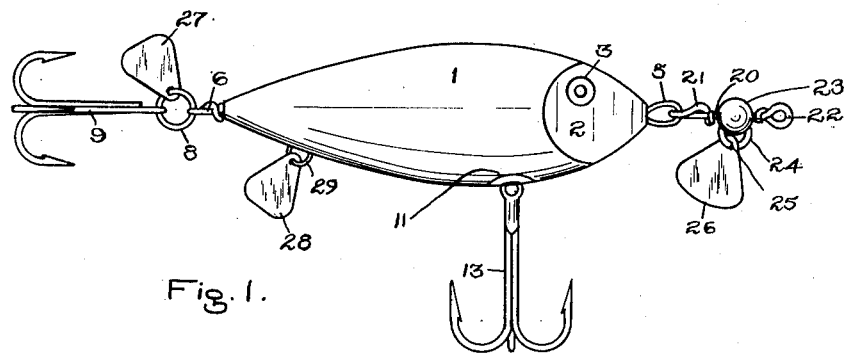

J. L. DONALY.
FISHING BAIT.
APPLICATION FILED JAN. 7, 1911.

1,093,980.

Patented Apr. 21, 1914.

WITNESSES
Cornelius Zabriskie
Frances M. Blodgett

INVENTOR
James L. Donaly,
BY
Russell M. Everett,
ATTORNEY.

UNITED STATES PATENT OFFICE.

JAMES L. DONALY, OF NEWARK, NEW JERSEY.

FISHING-BAIT.

1,093,980.  Specification of Letters Patent.  Patented Apr. 21, 1914.

Application filed January 7, 1911. Serial No. 601,277.

*To all whom it may concern:*

Be it known that I, JAMES L. DONALY, a citizen of the United States, residing at Newark, in the county of Essex and State of New Jersey, have invented certain Improvements in Fishing-Baits, of which the following is a specification.

This invention relates to baits or lures for anglers' use such as may be used for casting trolling or surface fishing, and the objects of the invention are to secure such a bait or lure as will resemble some form of live bait, as the fish shown in the drawings; to provide the bait with blades which will have different natural movements adapted to attract the fish; to provide means for attaching a hook which shall permit the ready application and removal of said hook; to secure a bait that is well balanced and will occupy a natural position in the water; to secure a simple and durable construction which shall not present undue obstruction to the passage of the bait through the water, and to obtain other advantages and results as may be brought out in the following description.

Figure 2:
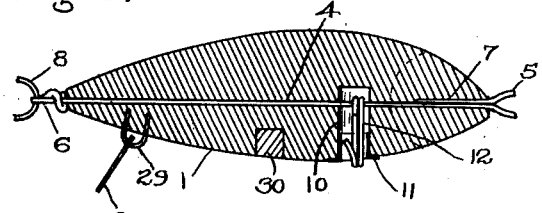
Figure 3:
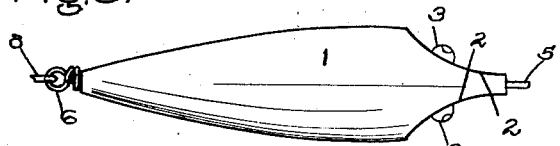
Figure 5:
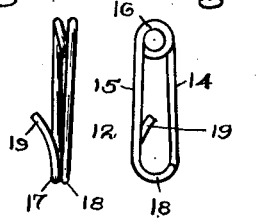
Figure 4:
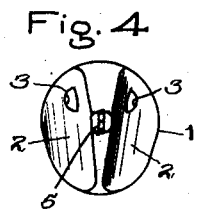
Figures 6, 7:
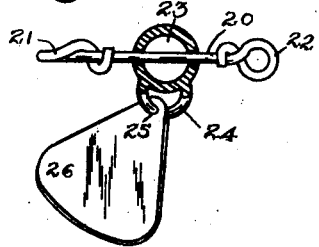

Referring to the accompanying drawings, in which like numerals of reference designate corresponding parts throughout the several figures, Figure 1 is a side elevation of my improved fishing bait; Fig. 2 is a central longitudinal section of the body of the same; Fig. 3 is a plan view of the bait; Fig. 4 is a front elevation of the bait; Fig. 5 is a view of the front oscillating blade, partly in section; Fig. 6 is an edge view of the spring-link on which a fish-hook hangs underneath the bait, and Fig. 7 is a side view of the same.

In said drawings, 1 indicates a buoyant body portion of wood or other suitable material, preferably shaped in imitation of a fish, as shown, and painted as desired. The head of this fish-shaped body portion 1 is tapered by opposite vertical recesses 2, 2, said recesses having their bottoms curved longitudinally of the fish-shaped body and preferably converging vertically downward as shown in Fig. 4 so as to give the bait a V-shaped head which tends to keep said head up as the bait is drawn through the water. The eyes 3, 3 are located in said recesses 2, 2 on opposite sides of the head of the bait.

The fish-shaped body 1 is bored longitudinally from tip to tip and a wire 4 extends therethrough, said wire having at its opposite ends loops 5, 6 which lie close to the opposite ends of the body 1 to prevent longitudinal motion of said wire 4 in said body and also provide means for attaching other parts hereinafter described. The loop 5 at the head of the body portion 1 is preferably formed by doubling back the end of the wire and soldering it behind the loop or eye 5 flatwise against the main portion of the wire, as at 7; by so doing a flattened portion is provided which when forced into the body 1 will prevent the wire 4 from turning. A ring 8 passes through the loop 6 at the tail of the body 1 and also through the eye of a fish-hook 9 of any suitable and well-known type, so that said hook is connected to the said body.

Intermediate of its ends the fish-shaped body portion 1 has a tubular socket 10 bored upward in itself from its under side and extending past the wire 4, as shown in Fig. 2. Preferably this socket 10 is located a little forward of the middle of the fish-shaped body, although it can be located as desired. The mouth of said socket 10 is preferably protected by a light metal bushing 11. In said socket 10 is loosely arranged a spring-link 12 having its inner end attached to the bait body and its outer end adapted to detachably receive a fish-hook 13. Preferably the outer end of said spring-link 12 does not project materially from the socket 10, so that when the fish-hook 13 is not used said spring-link will afford little or no obstruction to the passage of the bait through the water, it being understood that the purpose of the spring link is to enable the fish-hook 13 to be attached and detached at pleasure. Said spring-link is preferably formed of a piece of wire doubled so as to provide opposite parallel portions 14, 15 with a spring eye 16 therebetween at one end, after the manner of a safety pin. This eye 16 preferably receives the wire 4, as a convenient means of attachment of the spring-link to the bait body. At the opposite or outer end of the spring-link the parallel side portions 14, 15 have curved ends 17, 18 which are pressed flatwise together in the plane of the link by the resiliency of the spring eye 16, although they can be forced apart to permit the attachment of the fish-hook 13 similar to putting a key upon a key ring. For greater convenience one of said ends, as 17, has an outwardly curved extremity 19 onto which the eye of the fish-hook can be readily caught in attaching it; the other end 18, however, lies close to the opposite arm, although it can be readily separated therefrom by the thumb nail for removal of the fish-hook 13.

At the front end of the bait is a short straight wire 20 with an eye at each end, one as 21 engaging the loop 5 at the front end of the wire 4, and the other eye 22 adapted to receive the fish-line. Upon this wire 20, between said eyes 21, 22 is a rotatable hollow ball 23 having at one side of itself a bow 24 arranged in the plane of the wire 20. Upon this bow 24 is hung by means of a hole 25 in one corner of itself a triangular blade 26, said blade being preferably of flat sheet-metal and having its base and corners rounded, as shown. This blade 26 is loosely hung upon the bow 24, and as the bait is drawn through the water slowly, said blade oscillates from side to side until when the speed of the bait becomes fast enough said blade revolves completely around the wire 20, the ball 23 turning thereon.

I prefer to place upon the upper part of the ring 8 a rear oscillating blade 27, and upon the under side of the fish-shaped body portion 1, near its rear end or tail, a bottom oscillating blade 28 attached to said body 1 by a staple 29 arranged in the vertical longitudinal plane of the bait, substantially. Both these blades 27 and 28 are similar to the front blade 26, except preferably of thinner sheet-metal, although of course any of the blades can be varied in size or weight without departing from my invention. Their shape can also be varied somewhat, both as to edge lines and departure from flatness, without removing them from the scope of my invention under the doctrine of equivalents. The rear blade 27 and bottom blade 28 of course simply oscillate and do not revolve completely.

It will be understood that as the bait is drawn through the water the rear hook 9 extends backward very much as shown in Fig. 1 with the blade 27 just in front of it, and the under hook 13 also trails backward so that its barbed prongs lie close to the blade 28. Obviously, therefore, as the bait travels through the water, the blades 27, 28 will create disturbances which obscure the hooks 9, 13 from view.

The body portion 1 may be weighted or ballasted in any suitable manner, as by the lead plug 30, which I have shown in Fig. 2.

Obviously the recesses 2, 2 at the head of the fish-shaped body portion afford space for the movements of the front blade 26, especially when a larger one than shown in the drawings is employed.

The curved extremity 19 of the attached end of the spring link 12 which enables the fish-hook to be readily caught thereon, as explained, flares sufficiently to prevent the hook from passing it when in place on the spring link, so that there is no danger of the hook becoming inadvertently detached.

Just before using the bait, the hollow ball 23 is preferably filled with oil, which it retains to a considerable degree, thus serving as an oil-cup, so that the rotation of the front blade upon the wire 20 is facilitated.

Having thus described the invention, what I claim is:

1. In a fishing bait, the combination with an elongated buoyant body, of a non-rotatable member providing a bowed portion projecting from the body in fixed relation thereto and longitudinally thereof, and a substantially triangular blade with a perforation near its apex receiving said bowed portion, said blade adapted to oscillate transversely of the body and be limited at the ends of its oscillations by contact with said body, whereby an effect is secured in the bait simulating the moving fin of a fish.

2. In a fishing bait, the combination with an elongated buoyant body, of a non-rotatable member at the rear part of said body providing a bowed portion disposed longitudinally of said body, a triangular blade with a transverse perforation near its apex receiving said bowed portion, said blade adapted to oscillate in a plane transverse to the body and prevented from rotating by engaging the part adjacent said bowed portion, and a hook attached to the body and adapted to lie adjacent said blade in operation of the bait.

3. In a fishing bait, the combination of an elongated body having a tubular socket extending transversely inward from its outer surface, a spring-link in said socket comprising arms hinged together at one end and at the other resiliently engaging each other, and means for securing said link at the hinged end of said arms pivotally in said socket, the other end of the spring-link lying free in the mouth of the socket.

4. In a fishing bait, the combination of an elongated body having a tubular socket extending transversely inward from its outer surface, a wire extending longitudinally of said body and transversely through said socket, and a spring-link in said socket having at one end an eye receiving said wire and at its other end arms oppositely curved in the plane of the spring-link and resiliently engaging each other in sidewise relation.

5. In a fishing bait, the combination of an elongated body having a tubular socket extending transversely inward from its outer surface, and a spring-link in said socket comprising resilient arms hingedly connected at one end and at the other end curved in the plane of the spring-link and normally lying flatwise together, one of the curved ends of said arms being bent flaring outward away from the other arm.

JAMES L. DONALY.

Witnesses:
 CORNELIUS ZABRISKIE,
 FRANCES E. BLODGETT.